March 13, 1962  E. V. GARNETT  3,024,916
VEHICLE DERRICK

Filed July 16, 1956  5 Sheets-Sheet 1

INVENTOR.
EDWARD V. GARNETT
BY
Horace B. Van Valkenburgh
ATTORNEY

March 13, 1962   E. V. GARNETT   3,024,916
VEHICLE DERRICK
Filed July 16, 1956   5 Sheets-Sheet 2
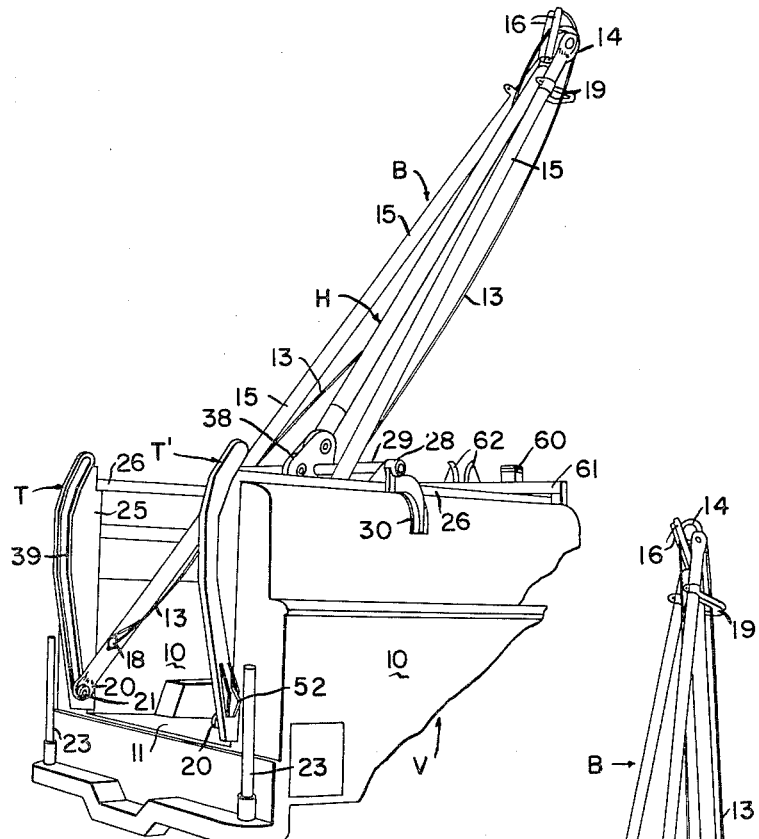
FIG. 3.
FIG. 4.
INVENTOR.
EDWARD V. GARNETT
BY
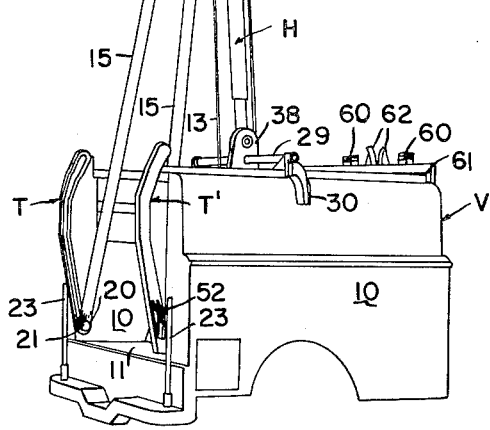
ATTORNEY

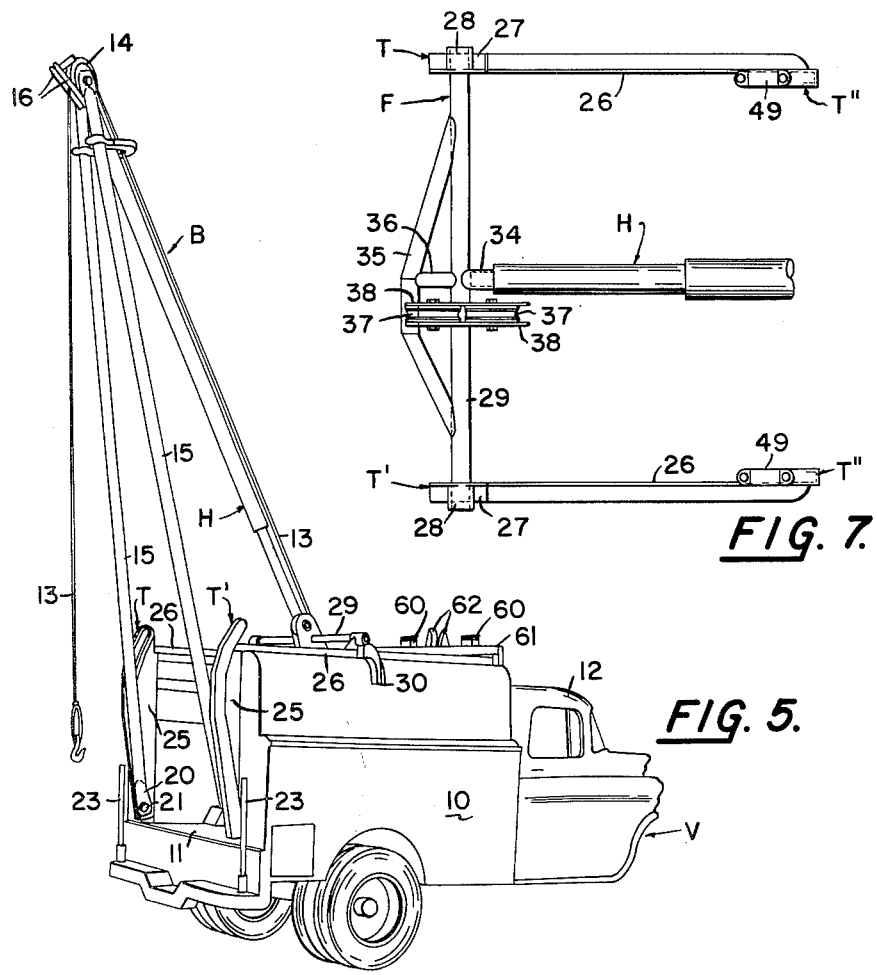
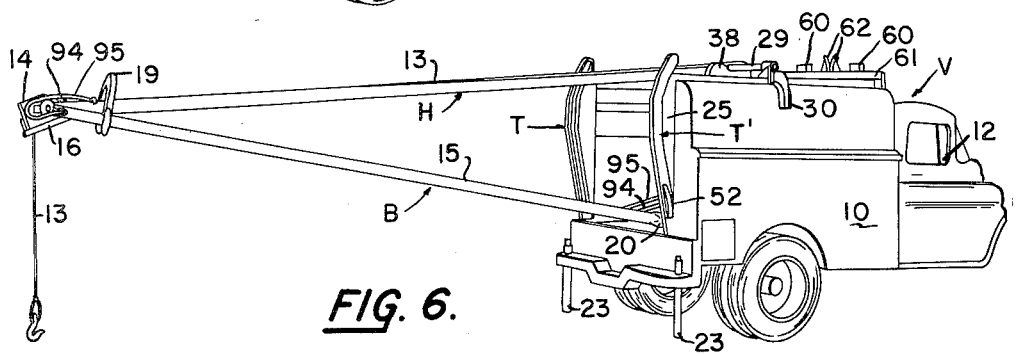

March 13, 1962  E. V. GARNETT  3,024,916
VEHICLE DERRICK
Filed July 16, 1956  5 Sheets-Sheet 4
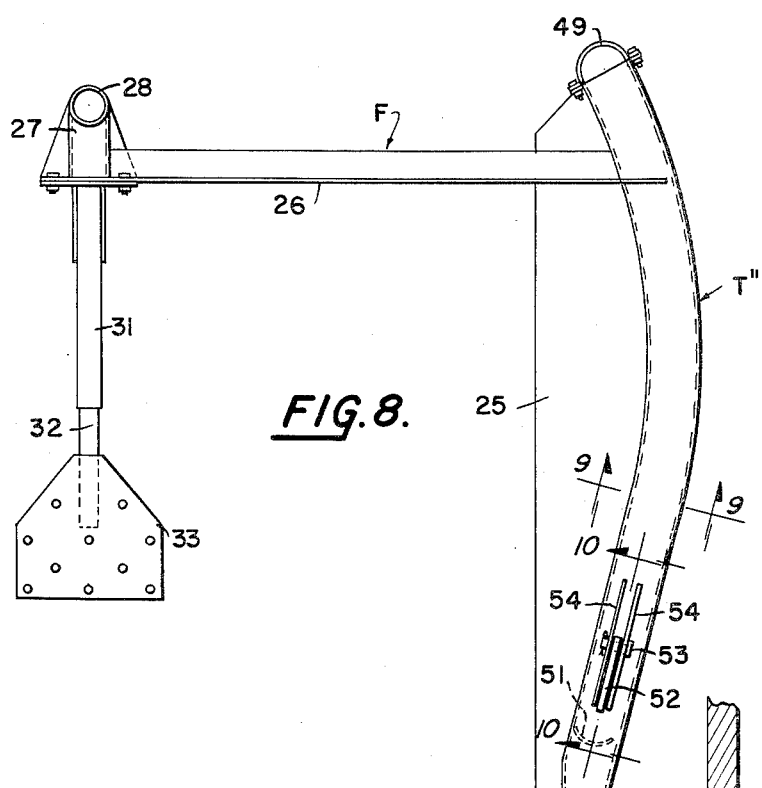
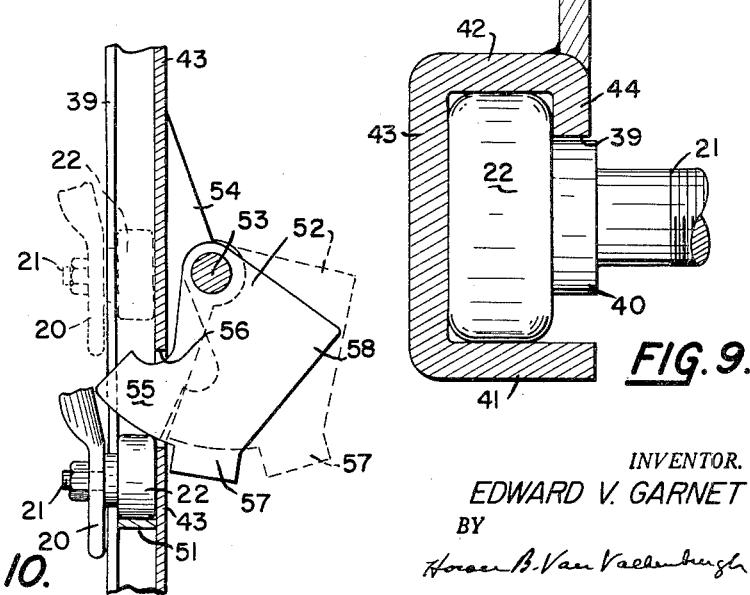
INVENTOR.
EDWARD V. GARNETT
BY
Horace B. Van Valkenburgh
ATTORNEY March 13, 1962 E. V. GARNETT 3,024,916
VEHICLE DERRICK Filed July 16, 1956 5 Sheets—Sheet 5

INVENTOR.
EDWARD V. GARNETT
BY
Horace B. Van Valkenburgh
ATTORNEY

United States Patent Office 3,024,916
Patented Mar. 13, 1962

3,024,916
VEHICLE DERRICK
Edward V. Garnett, 3963 Walnut St., Denver, Colo.
Filed July 16, 1956, Ser. No. 598,062
5 Claims. (Cl. 212—8)

This invention relates to derricks and more particularly to a derrick which is especially adapted to be mounted on a vehicle as a portable unit.

Among the objects of the present invention are to provide a novel vehicle derrick; to provide such a derrick which may be placed in a storage position, such as over the vehicle, and may be readily moved from such storage position to an operating position; to provide such a derrick which may be moved hydraulically between storage and operating positions and vice versa, as well as between different operating positions; to provide such a derrick which includes novel means for guiding the derrick boom during movement between storage and operating position and vice versa; to provide such a derrick which is automatically placed in operating condition when moved to an operating position from storage position; to provide such a derrick which may be readily mounted upon a truck, such as a panel type truck; to provide such a derrick whose movement is smooth, rather than jerky, between storage and operating position, and vice versa, as well as between different operating positions; and to provide such a derrick which is sturdy in construction, yet is readily manufactured.

Additional objects and the novel features of this invention will become apparent from the description which follows, taken in connection with the accompanying drawings, in which:

FIG. 3 is a similar fragmentary perspective view, showing the derrick boom in a further intermediate position;

FIG. 4 is a similar fragmentary perspective view, showing an elevated position of the derrick boom, as for loading articles into or out of the truck, such position also being a further intermediate position in movement of the derrick boom to or from position for handling loads rearwardly of the truck;

FIG. 5 is a similar fragmentary perspective view, illustrating the position of the derrick boom for handling loads at the rear of the truck;

FIG. 6 is a similar fragmentary perspective view, illustrating the derrick boom in position for handling loads at a considerable distance from the rear of the truck;

FIG. 7 is a top plan view of a modified framework structure forming a part of the derrick and adapted to be installed on a conventional panel type truck, a portion of the hydraulic leg of the boom also being shown;

FIG. 8 is a side elevation of the framework structure of FIG. 7;

FIG. 9 is an enlarged transverse cross section of a portion of a track for the lower end of the boom legs, taken along line 9—9 of FIG. 8 and showing also a roller which is attached to the lower end of each boom leg;

FIG. 10 is an enlarged, inclined section, taken along line 10—10 of FIG. 8, illustrating an automatic locking device for a boom leg;

Figure 1:
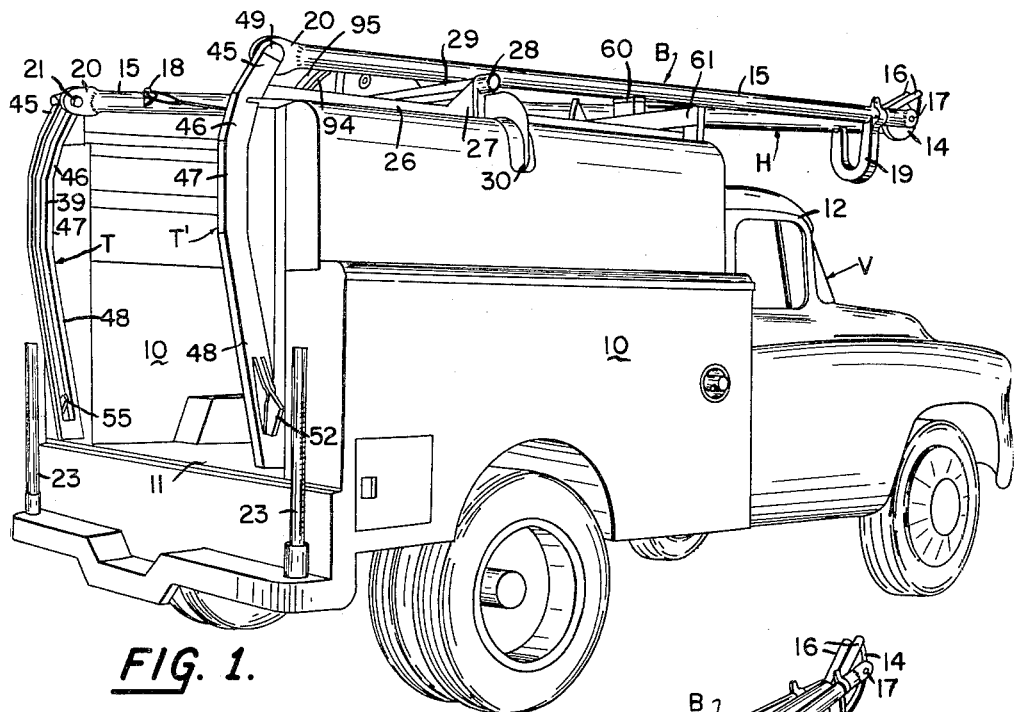
FIG. 1 is a perspective view, taken from a rear position, of a panel type truck and a derrick, constructed in accordance with this invention, mounted on the truck with the derrick boom shown in a flat or storage position over the truck.
Figure 2:
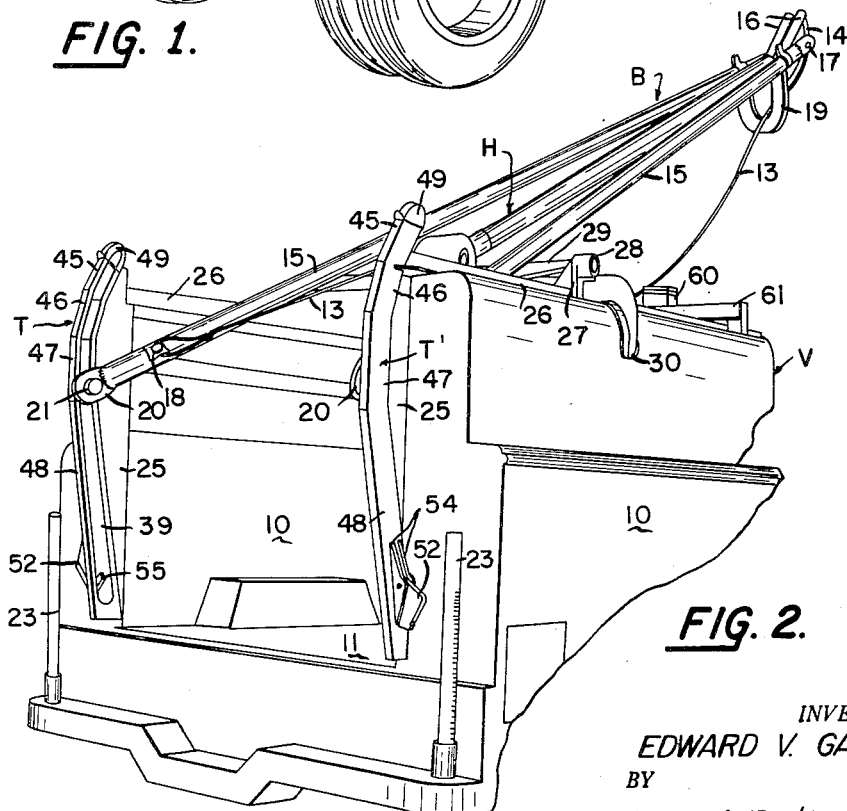
FIG. 2 is a fragmentary perspective view, similar to FIG. 1, but showing the derrick boom in an intermediate position, as during movement from storage to use positions, or vice versa.

A derrick constructed in accordance with this invention, as shown in FIGS. 1 and 2, may include a boom B which may be mounted upon a vehicle V, such as a truck of a conventional type having side panels 10 extending upwardly from a bed 11 and rearwardly from the operator's cab 12. A conventional power winch (not shown) may be mounted upon bed 11 behind cab 12, with a hoisting cable 13 wound thereon and adapted to be extended and threaded over a sheave mounted in a sheave housing 14 at the upper end of the boom. The derrick includes a frame, a modified form of which is frame F of FIGS. 7 and 8, described later, which may be attached to the top and the rear ends of the panels 10 and on which boom B is mounted in a manner which permits it to be swung to a flat position over the truck above the panels 10 and cab 12 for storage, as in FIG. 1, to be moved upwardly by extension of a hydraulic leg H through the respective positions of FIGS. 2 and 3 to the position of FIG. 4, for loading articles into and out of the truck, as well as to the positions of FIGS. 5 and 6, for handling loads at the rear of the truck. The boom may also be moved in the reverse direction by retraction of the hydraulic leg H.

The boom B may include a pair of side legs 15, which are connected at the top to housing 14 and spaced apart at the base, and the central or hydraulic leg H, which is used in moving the boom B between the various positions illustrated in FIGS. 1–6, inclusive, as well as to assist in handling loads. The sheave may be of any desired type and the sheave housing 14 may be provided on the front side, i.e., the front side during use, as in FIGS. 4, 5 and 6, with a pair of guide rollers 16 mounted at each side of the housing at a position to engage the cable as it passes to and from the sheave. The upper ends of the boom legs 15 may be flattened and provided with aligned holes, through which a pin 17 extends, to attach the upper ends of the boom legs together and also to provide a shaft or pin for the sheave within housing 14, while one of the boom legs may be provided with an anchor 18 to which the free end of cable 13 may be attached, as in FIG. 2, to prevent entanglement of the hoisting cable when not in use. A U-shaped yoke 19, connected between boom legs 15 adjacent the upper ends and described in greater detail later, in connection with FIG. 11, also assists in guiding the hoisting cable 13 and preventing entanglement thereof. The lower end 20 of each boom leg may also be flattened and provided with a pin 21 on which a roller 22 of FIG. 9 may be mounted, for movement within a track T or T′, respectively, the tracks T and T′ forming a part of the framework F and each being mounted at the rear of one of the side panels 10. The truck may also be provided at the rear with a spaced pair of conventional jack legs 23 which may be extended to engage the ground and thereby provide additional support for the boom, particularly when heavy loads are encountered or the boom is extended a considerable distance rearwardly of the truck, as in FIG. 6.

The derrick frame, as in FIGS. 1 and 2 and in the modified construction of FIGS. 7 and 8, may include a track supporting plate 25 at the rear on each side on each of which one of tracks T or T′ is mounted and which is also attached to the rear end of the respective side panel 10. From an upper position on each plate 25 and track T or T′, a beam 26 may extend forwardly, conveniently overlying the respective side panel 10, to a bracket 27 which supports a transversely extending tubular collar 28, the collars 28 forming a bearing for a shaft or bar 29, to which the hydraulic leg H is attached. As in FIGS. 1 and 2, each bracket may be attached to the side panel 10 by an anchor 30 which overlies and conforms on its underside to a portion of the top of the panel and may also be bolted thereto. Or, as in FIG. 8, a tubular post 31 may extend downwardly from each bracket 27, on the inside of the respective panel 10, post 31 conveniently being provided with an interfitting tube 32, which may be welded to post 31 at the time of installation, so as to position a mounting plate 33, attached to tube 32, as by welding, at an appropriate elevation for attachment to the inside of the respective panel 10, as by bolts extending through the holes shown in plate 33 in FIG. 8. The hydraulic leg H, as in FIG. 7, may be attached at its lower end to a nipple 34 conveniently cut to shape to enable it to be welded to shaft 29, which may also be tubular. On the opposite side of shaft 29, a reinforcing brace 35, conveniently formed of tubular sections welded together, may be welded at its opposite ends to shaft 29 and adjacent its center, spaced from shaft 29 by a transverse brace 36, which may also be tubular and welded to shaft 29 and brace 35. It will be noted that brace 35 need not be symmetrical, but may be slightly irregular, so as to accommodate a pair of sheaves 37 between which the hoisting cable 13 may pass and which may be mounted for rotation between plates 38, each attached to shaft 29, as by welding.

The tracks T and T' of FIGS. 1 and 2, as will be evident, are substantially identical in construction, except that they are complementary, i.e., mirror images, so that each track may be provided with an inwardly facing slot 39. Also, each roller 22 may rotate with a spacing sleeve 40, as in FIG. 9, which holds the lower ends 20 of each boom leg 15 away from the inside of the track. Each track, from its upper end, extends generally outwardly and downwardly and thence downwardly and inwardly to the lower end. Each track, as in the case of the track T" of FIG. 8, may follow a smooth curve, having a configuration such that for successive portions of the track, engaged by the lower end of a boom leg, a tangent to the track curve will form an obtuse angle, i.e., greater than 90°, with the longitudinal axis of the boom leg, the angle being measured on the underside of the boom leg. This will be evident by placing a right angle triangle on FIG. 8, with the 90° apex on the rear edge of track T" at its upper end and with the hypotenuse down and a shorter side of the triangle on collar 28, or slightly thereabove. As the 90° apex of the right triangle is moved downwardly along track T" and the aforesaid side of the triangle is maintained slightly above collar 28, thus simulating the movement of a boom leg 15 over shaft 29, from the position of FIG. 1 through the position of FIG. 2 to the position of FIG. 3, it will be seen that the track T", at the 90° apex of the triangle, will always curve outwardly from the other shorter side of the triangle, thus showing that the angle mentioned above will always exceed 90°. As a result of such configuration of the track, when the lower end of a boom leg is thrust against the track by retraction of hydraulic leg H, i.e., roller 22 of FIG. 8 will be thrust against the track rear flange 41 of FIG. 9, the track will force or wedge the lower end of the boom leg downwardly and continuously as long as retraction of hydraulic leg H continues, until the lower end of the boom leg reaches the bottom of the track. Similarly, with the boom leg at the bottom of the track, when hydraulic leg H is extended, a thrust against the track in the opposite direction will be produced, i.e., roller 22 will be pulled against the track forward flange 42 of FIG. 9. Due to the obtuse angle, on the underside of the boom leg, between a tangent to each successive point on the track and the longitudinal axis of the boom leg, the lower end of the boom leg will be pulled up along the track, as long as hydraulic leg H continues to be extended, from the boom position of FIG. 3 through the position of FIG. 2 to the position of FIG. 1. The track T" of FIG. 8, as in FIG. 9, may be formed by a special channel 43 having inner and outer flanges 41 and 42 respectively, and also a longitudinally extending flange 44 on the inside to prevent roller 22 from slipping inwardly from the channel accidentally. Slot 39 is, of course, formed between the edge of flange 44 and the outer flange 41. Channel 43 may be conventional stock which is bent to shape to form track T", or may be formed of two or more strips of plate, bent to the shape and welded together. Instead of the track being shaped along a smooth curve, straight sections of channel 43 may be cut to length, with approximately beveled ends and welded together, as in the case of tracks T and T' of FIGS. 1 and 2, wherein each of the straight sections 45 to 48, inclusive, correspond in inclination to a tangent to the center line of track T" of FIG. 8 at appropriately selected positions, the extent of each section 45 to 48, inclusive, being such that when the lower ends of the boom legs, as through rollers 22, are thrust against the track by retraction of hydraulic leg H, the lower ends of the boom legs will be automatically pushed down the track, since at each point of the track engaged by the roller, the angle between the track section engaged and the longitudinal axis of the boom leg, measured on the underside, will exceed 90°. For the same reason, extension of the hydraulic leg H will cause the lower ends of the boom legs to be pulled up the tracks.

The upper end of track T" of FIG. 8, as well as tracks T and T' of FIGS. 1 and 2, may be provided with a cap 49, which may be removably attached thereto, as by bolts, as shown, to permit initial entry of roller 22 or the removal of the derrick legs, when desired, but to prevent upward movement of the rollers 22 out of the tracks during use. Also, an arcuate stop 51, as in FIGS. 8 and 10, may be welded in position adjacent the lower end of track T", for engagement by roller 22 when it reaches the desired lower position, while tracks T and T' of FIGS. 1 and 2 may be similarly provided with stops adjacent their lower ends, or a stop may be provided in any other suitable manner. As will be evident, when roller 22 engages stop 51, it provides an excellent bearing for pivotal movement of legs 15 and pin 21, so that the legs 15 may be moved from the position of FIG. 3 to the position of FIGS. 4, 5 and 6, or any intermediate position. However, it is desirable to lock rollers 22 in such lower position, as by a pin inserted through an appropriate hole in the web of channel 43, just above roller 22, although it is more desirable that rollers 22 be automatically locked in position when they reach the lower ends of the tracks.

For such automatic locking, each track T and T' of FIGS. 1 and 2, as well as track T" of FIG. 8 may, as illustrated more clearly in FIGS. 8 and 10, be provided with a locking device, which may include a plate cam 52 mounted for pivotal movement on a pin 53 between brackets 54, which may be welded in spaced position on the outside of each track. The cam 52 may be provided with an inwardly extending ear 55 at the lower inner corner having curved upper and lower surfaces which permit ear 55 to swing through a slot 56 in the web of the channel 43, as well as a downwardly extending lug 57 at the lower outer corner. The upper outer corner 58 of the cam is preferably disposed outwardly a sufficient distance that the center of gravity of cam 52 will normally be outwardly from the center of pivotal movement at pin 53, so that cam 52 will normally be swung by gravity to the full position of FIG. 10, until lug 57 engages the track. However, as the lower end of a boom leg moves downwardly along the track, with roller 22 inside the track, as the boom leg and particularly the flattened lower end 20 thereof move downwardly past the dotted position of FIG. 10, the lower edge of the flattened lower end 20 of the boom leg will strike the inclined inner edge of ear 55 and will cause cam 52 to fly outwardly, as to the dotted position of FIG. 10. Since the boom leg is moving downwardly at the time, before cam 52 can move back, roller 22 will have moved downwardly either past ear 55 or to a position opposite ear 55, so that ear 55 cannot reenter the space within the track until roller 22 has reached the lower stop or full position of FIG. 10. Since the roller will then be seated against the arcuate stop 51, cam 52 can then swing by gravity back to the full position of FIG. 10, in which the lower surface of ear 55 will be wedged against the upper surface of roller 22, thereby preventing upward movement of the roller and locking the lower ends of the boom legs to the lower end of the track. As will be evident, when the boom legs have reached this position, the derrick may be moved to any of the positions of FIGS. 4 to 6, inclusive, or any intermediate position, without the lower ends of the boom legs 15 moving from the lower ends of the tracks, particularly when the hydraulic leg H is retracted to move the boom toward the truck.

For erection of the boom from the storage position of FIG. 1 to the use positions of any of FIGS. 4–6, inclusive, or any intermediate position, the hydraulic leg H is first extended, the reaction forcing the rollers 22, as described above, downwardly along the tracks T and T', while at the same time the boom legs 15 will slide along shaft 29 from the position of FIG. 1 to the position of FIG. 2, and then to the position of FIG. 3. In the position of FIG. 3, the lower ends of the boom legs 15 will be locked at the lower ends of the tracks, as described above, so that hydraulic leg H may then be extended to elevate the boom legs to the position of FIG. 4. During erection of the derrick, the free end of the hoisting cable 13 may be attached to anchor 18, as in FIGS. 2 and 3, with sufficient slack so as not to interfere with the erection of the derrick. However, if an article is to be unloaded from the truck when the derrick reaches the position of FIG. 4, the hoisting cable 13 may be detached from anchor 18 and attached to the article to be lifted out of the truck. Then, sufficient tension may be placed on the hoisting cable by the winch to lift the article free from the truck bed 11, after which the hydraulic leg H may be further extended, as to the position of FIG. 5, in which the article may then be lowered to the ground. Of course, if the article is to be deposited further rearwardly of the truck, the hydraulic leg H may be extended to any position intermediate those of FIGS. 5 and 6, after which the article may be deposited on the ground. The loading of an article into the truck may be accomplished by extending the derrick rearwardly until it is sufficiently close to a position directly above the article that a satisfactory lifting operation may ensue, after which the hoisting cable may be attached to the article which is then lifted off the ground by the cable, whereupon the hydraulic leg H may be retracted, as to the position of FIG. 5 and then to the position of FIG. 4, the article, of course, being lifted sufficiently by the hoisting cable that it will clear the truck bed, after which the article may be lowered by the hoisting cable into the truck bed.

Other operations which may be carried out by the derrick include the pulling of poles, as by backing the truck to a position adjacent the pole and wrapping the hoisting cable, or an auxiliary cable, around the pole, the force exerted by the hydraulic leg H conveniently being used in pulling poles, since this is normally considerably greater than the force adapted to be exerted by the cable winch. During pulling of poles, the jack legs 23 may be lowered to the ground to provide additional support for the rear end of the truck. In addition, articles may be shifted to various positions rearwardly of the truck.

After the derrick has been used and it is desired to move the truck and derrick to another position, if it is necessary to drive along a highway, or if overhead wires or other structures might be encountered, the derrick may be moved back to the storage position. For this purpose, assuming that the derrick is in the position of either FIG. 5 or FIG. 6, the hydraulic leg H may be retracted to the position of FIG. 4 and then to the position of FIG. 3, in which the boom legs 15 rest against shaft 29. Then, each cam 52 may be moved outwardly to the dotted position of FIG. 10, as by placing a pry bar or the like between lug 57 and the track. Of course, each cam 52 may at times be pulled outwardly by hand, but normally it is wedged inwardly against roller 22, so that additional force is normally necessary. In any event, since the weight of boom leg 15 and hydraulic leg H overhangs shaft 29 in a forward direction, when each cam 52 is released, the lower end of each boom leg 15 will move upwardly to move roller 22 to a position opposite or past ear 55. Whenever roller 22 clears ear 55, cam 52 will move back to the full position of FIG. 10 by gravity. After both cams 52 have been thus released, hydraulic leg H may then be extended, to move the upper ends of the boom legs 15 forwardly and cause boom legs 15 to slide along shaft 29 and also cause rollers 22 to move upwardly to the upper ends of the tracks, as through the position of FIG. 2 to the position of FIG. 1. When rollers 22 reach the upper ends of the tracks, the boom legs 15 will rest upon shaft 29 and also upon a pair of blocks 60 mounted atop a transversely extending bracket 61, conveniently mounted on the front ends of panels 10 and also provided with a centrally disposed pair of upstanding ears 62, shown more clearly in FIGS. 3 to 6, inclusive, which receive the hydraulic leg H therebetween. In this storage position, one end of hydraulic leg H is, of course, attached to shaft 29 and the hydraulic leg also rests on bracket 61 between ears 62. Blocks 60 are preferably provided, for boom legs 15, since the hydraulic leg H is not only normally larger in diameter than boom legs 15, but also extends from the center line of shaft 29, while boom legs 15 rest on top of the shaft 29.

Figure 11:
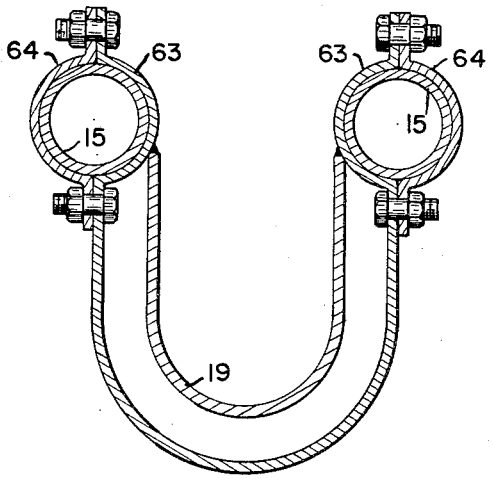
FIG. 11 is an enlarged cross section of a cable guide yoke attached to the boom legs adjacent the upper ends thereof.

The yoke 19, which, as indicated previously, guides the hoisting cable 13 to the sheave, may be constructed in the manner shown in FIG. 11. Thus, yoke 19 may be formed of plate bent to shape and welded together to form a U-shaped box structure provided at each upper end with a semi-circular cap 63 adapted to engage one side of a boom leg 15 and clamped to the boom leg, as by a removable semi-circular cap 64 attached to cap 63 in a suitable manner, as by bolts, as shown.

Figure 12:
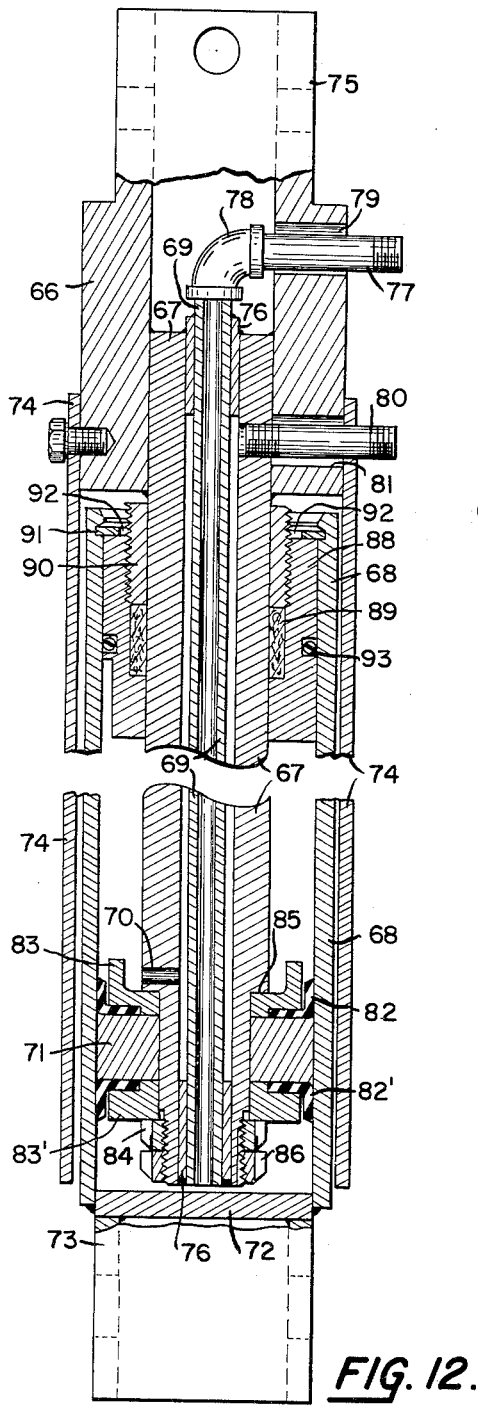
FIG. 12 is a condensed longitudinal section of a hydraulic cylinder assembly, which forms the central leg of the boom.

The hydraulic leg H may be constructed in any suitable manner, since the construction of the hydraulic leg illustrated in FIG. 12 is exemplary only and not intended to be a limitation. Thus, the hydraulic leg H may include an upper cap 66 to which is attached a hollow piston shaft 67 movable longitudinally with respect to an elongated cylinder 68, a supply pipe 69 extending axially of the piston shaft 67 to supply hydraulic fluid under pressure to the interior of cylinder 68 beneath the piston, the hydraulic fluid supplied to the opposite side of the piston passing around pipe 69 and through one or more transverse holes or ports 70, adjacent the lower end of the piston shaft and preferably just above the piston which includes a block 71. The lower end of the cylinder may be closed by a cap 72, such as an annular plate welded to the cylinder and to which an attachment tube 73 may be attached in a suitable manner, as by welding, for connection to nipple 34 on shaft 29, as in FIG. 7. A sleeve 74, which may be attached to upper cap 65 in a suitable manner, as by a series of cap screws, as shown, surrounds cylinder 68 and prevents the ingress of foreign material to the portion of piston shaft 67 which is exposed when leg H is extended. Upper cap 66 may be hollow, as shown, so that the piston shaft 67 may be welded to the inside thereof and also may be provided with an upper reduced section 75 for attachment to sheave housing 14 of FIGS. 1–6. Supply pipe 69 may be held in a central position within piston shaft 67 by a sleeve 76 at each end of the piston shaft and conveniently welded to the piston shaft and also to the pipe 69 so as to provide a fluid-tight connection. Fluid to be supplied through pipe 69 may be introduced through a nipple 77 connected by an ell 78 with the upper end of pipe 69, nipple 77 conveniently extending through a hole 79 provided in cap 66. Fluid supplied to the interior of piston shaft 67, around pipe 69 for flow through port 70 both to and from the interior of cylinder 68, may conveniently be supplied through a nipple 80 which is connected to a threaded hole formed for that purpose adjacent the upper end of shaft 67 but below the upper sleeve 76 and extending through a hole 81 in cap 66 and also through sleeve 74. The piston may comprise the annular block 71, against opposite sides of which a cup packing ring 82 and 82' is held by a packing ring 83 and 83', respectively, the lower end of piston shaft 67 being threaded for engagement with a nut 84 adapted to clamp the piston assembly against a shoulder 85 formed on shaft 67 just below port 70, nut 84 being prevented from becoming loose by a keyed lock washer and a lock nut 86. At the upper end of cylinder 68, a suitable seal between the cylinder and piston shaft 67 is provided, such as by a packing gland 88 having a recess for receiving packing 89, such as of the Chevron type, the latter being held in position by a packing ring 90 which may threadedly engage the interior of packing gland 88. The packing gland 88 may be held in position by a snap ring 91 which is inserted within an annular groove formed on the inside of cylinder 68 adjacent the upper end and also provided with a series of inwardly extending teeth 92 for engaging the threads of packing ring 90. In addition, packing gland 88 may be provided with an annular groove 93 on the outside, adapted to receive suitable packing, such as an O-ring, for sealing purposes.

Fluid under pressure may be supplied to the nipples 77 and 80 through hoses connected with a conventional hydraulic pump which may be driven from the engine of the truck and installed in any convenient position. Conventional auxiliary equipment, including valves for controlling the flow of fluid through the hoses and a reservoir for receiving hydraulic fluid discharged from the cylinder through either of the hoses, is also provided. The hoses which connect with nipples 77 and 80 may conveniently extend from the respective nipples, such as hoses 94 and 95 shown in FIGS. 1 and 6, and be looped around, adjacent sheave housing 14, so as to enter one of the boom legs 15 adjacent the top thereof and extend down through the boom leg to a point adjacent the bottom, emerging from the bottom leg, as in FIGS. 1 and 6, for connection to the hydraulic pump assembly. Conveniently, there is sufficient slack in the hoses adjacent panel 10, to permit the boom leg 15 to move between the positions of FIG. 1 and FIG. 3 without danger of breaking the hoses. As will be evident, when hydraulic fluid is supplied under pressure through hose 95 to nipple 77 of FIG. 12, it will pass through supply pipe 69 to the lower end of piston shaft 67 and force the piston and piston shaft upwardly within the cylinder 68, thereby extending the hydraulic leg H. Normally, of course, cylinder 68 is filled with hydraulic fluid, so that as hydraulic leg H is extended, fluid within the cylinder above the piston will be forced through port 70 to pass around pipe 69 to nipple 80 and thence be discharged through hose 94 to the reservoir for receiving the same. When the hydraulic leg is to be retracted, the nipple 77 and hose 95 may be connected to the reservoir and fluid under pressure supplied from the pump through hose 94 to nipple 80, such fluid passing around the supply pipe 69 and out port 70 into cylinder 68 above the piston, thereby forcing the piston and piston shaft downwardly in the cylinder. As will be evident, the hydraulic leg H may be extended or retracted to any desired position by suitable control of the flow of fluid supplied under pressure through the hoses 94 and 95. It will be understood, of course, that any other suitable type of hydraulic cylinder and piston arrangement may be used.

From the foregoing, it will be evident that the vehicle derrick of this invention fulfills to a marked degree the requirements and objects hereinbefore set forth. As will be evident, the derrick may be moved to any desired position by the hydraulic leg, including numerous operating positions, as well as a storage position. Also, the hydraulic leg may be used in assisting the hoisting cable for the movement of heavy loads, or to provide an increase in the pulling effect, such as when removing line poles and the like. The track which cooperates with the lower end of each boom leg not only permits the derrick to be moved between storage position and operating position through a simple, effortless manipulation, but also insures that the boom legs will be in the desired position when the hydraulic leg is extended, following retraction for movement of the derrick from storage position. The use of an automatic locking device for holding the lower ends of the boom legs, permits the derrick to be moved from storage to operating position in a single movement. The rollers may be provided at the lower ends of the boom legs for engagement with the track and permit the derrick to be moved between storage and operating positions, and vice versa, with ease and rapidity and without undue friction, which might otherwise produce a jerky movement. Also, the rollers form a pivot for the boom during operation, thereby increasing the ease with which the boom may be moved between various operating positions. While the shaft or bar on which the hydraulic leg is mounted and the track means at the rear of the vehicle may be mounted independently, the connection thereof in a single frame provides a sturdier construction and reduces the problems involved in attaching the track and the shaft supporting parts to the vehicle. Of course, the derrick may be used with trucks other than of the panel type, as well as other types of vehicles, while appropriate changes may be made in the supporting and mounting means for the tracks, as well as the shaft or spindle bar to which the hydraulic leg is connected.

Although a preferred embodiment of this invention has been illustrated and described with particularity and certain variations therein indicated, it will be understood that other embodiments may exist and that other variations may be made, all without departing from the spirit and scope of this invention.

What is claimed is:

1. A derrick for a vehicle, comprising upright track means mounted at one end of the vehicle, said track means extending downwardly and outwardly from its upper end and downwardly and inwardly to its lower end; a boom slidably mounted at its lower end on said track means for movement therealong; transverse means mounted on said vehicle inwardly from said track means and engageable by said beam; extensible and retractable hydraulic means pivotally connected at one end to said boom adjacent the upper end thereof; means adjacent the lower end of said track means for locking the lower end of said boom thereto, said boom and track means being constructed and arranged so that said boom is pivotal about a point adjacent the lower end of said track means when locked thereto; and supporting means for said hydraulic means mounted on said vehicle inwardly from said track means, the opposite end of said hydraulic means being pivotally attached to said supporting means, said boom being movable between a generally horizontal storage position generally above said vehicle, with the lower end of said boom at the upper end of said track means, and a position with the lower end of said boom at the lower end of said track means.

2. A derrick for a vehicle, as defined in claim 1, wherein said boom is provided with a roller at its lower end which engages said track means and about which said boom is pivotal when locked to said track means.

3. A derrick for a vehicle, comprising upright track means mounted at one end of the vehicle and including a channel shaped member providing an opening along one side of said track and a flange extending across a portion of said opening; a stop extending across said track adjacent the lower end thereof; a removable cap closing the upper end of said track; a boom provided with a roller at its lower end for engaging said track means for movement therealong, said track being constructed and arranged to retain said roller therewithin; transverse means mounted on said vehicle inwardly from said track means and engageable by said boom; extensible and retractable hydraulic means pivotally connected at one end to said boom adjacent the upper end thereof; and supporting means for said hydraulic means mounted on said vehicle inwardly from said track means, the opposite end of said hydraulic means being pivotally attached to said supporting means.

4. A derrick for a vehicle, comprising upright track means mounted at one end of the vehicle; a boom connected at its lower end to said track means for movement therealong; transverse means mounted on said vehicle inwardly from said track means and engageable by said boom; extensible and retractable hydraulic means pivotally connected to said boom adjacent the upper end thereof; supporting means for said hydraulic means mounted on said vehicle inwardly from said track means, the opposite end of said hydraulic means being pivotally attached to said supporting means; and a locking device at the lower end of said track means, said locking device being shiftable by said boom leg as said leg moves downwardly to permit said boom leg to pass, said locking device then moving to locking position.

5. A derrick for a vehicle, as defined in claim 4, wherein said track means includes a channel shaped member substantially open at one side and provided with a longitudinal slot in the opposite wall adjacent the lower end thereof; said boom leg is provided with a transverse pin having a roller movable within said channel shaped member; and said locking device includes a plate disposed transversely to said track wall and having an ear at the lower inner corner extending through said slot in normal position and also in locking position, the inner edge of said ear being inclined so that said plate will be moved outwardly when the downwardly moving lower end of said boom leg strikes said inclined edge, to permit said roller to move past said plate, a pin for pivotally mounting said plate above said ear and outwardly from said wall, said plate having a center of gravity outwardly of said wall and a lug at the lower end for engaging the outside of wall below said slot.

References Cited in the file of this patent
UNITED STATES PATENTS

| | | |
|---|---|---|
| 1,388,831 | Broady | Aug. 23, 1921 |
| 2,611,580 | Troche et al. | Sept. 23, 1952 |
| 2,687,811 | Hurst | Aug. 31, 1954 |
| 2,715,014 | Garnett et al. | Aug. 9, 1955 |
| 2,740,536 | Bill | Apr. 3, 1956 |
| 2,753,055 | Hall | July 3, 1956 |
| 2,786,581 | Balogh | Mar. 26, 1957 |